June 23, 1925.  1,543,024

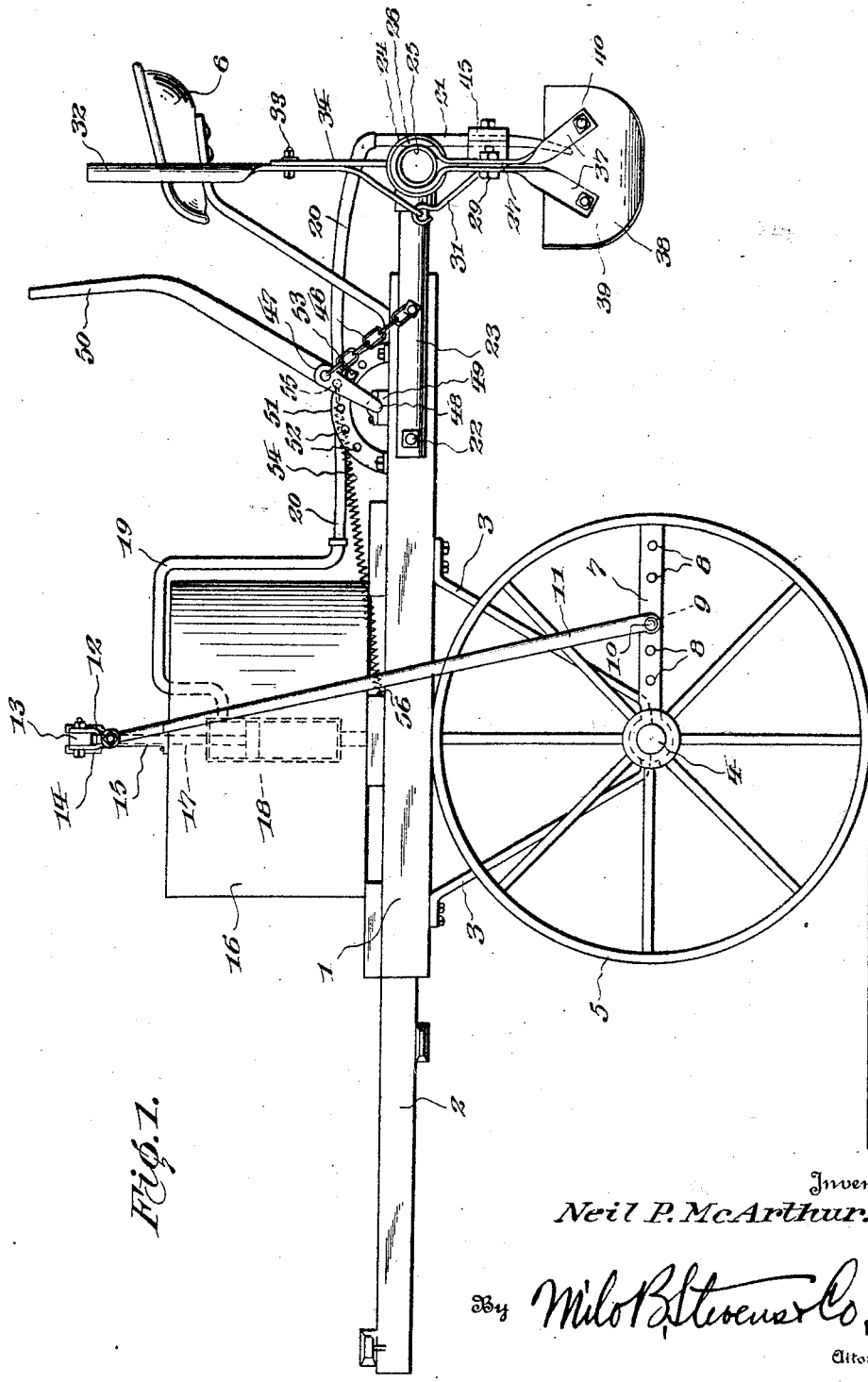

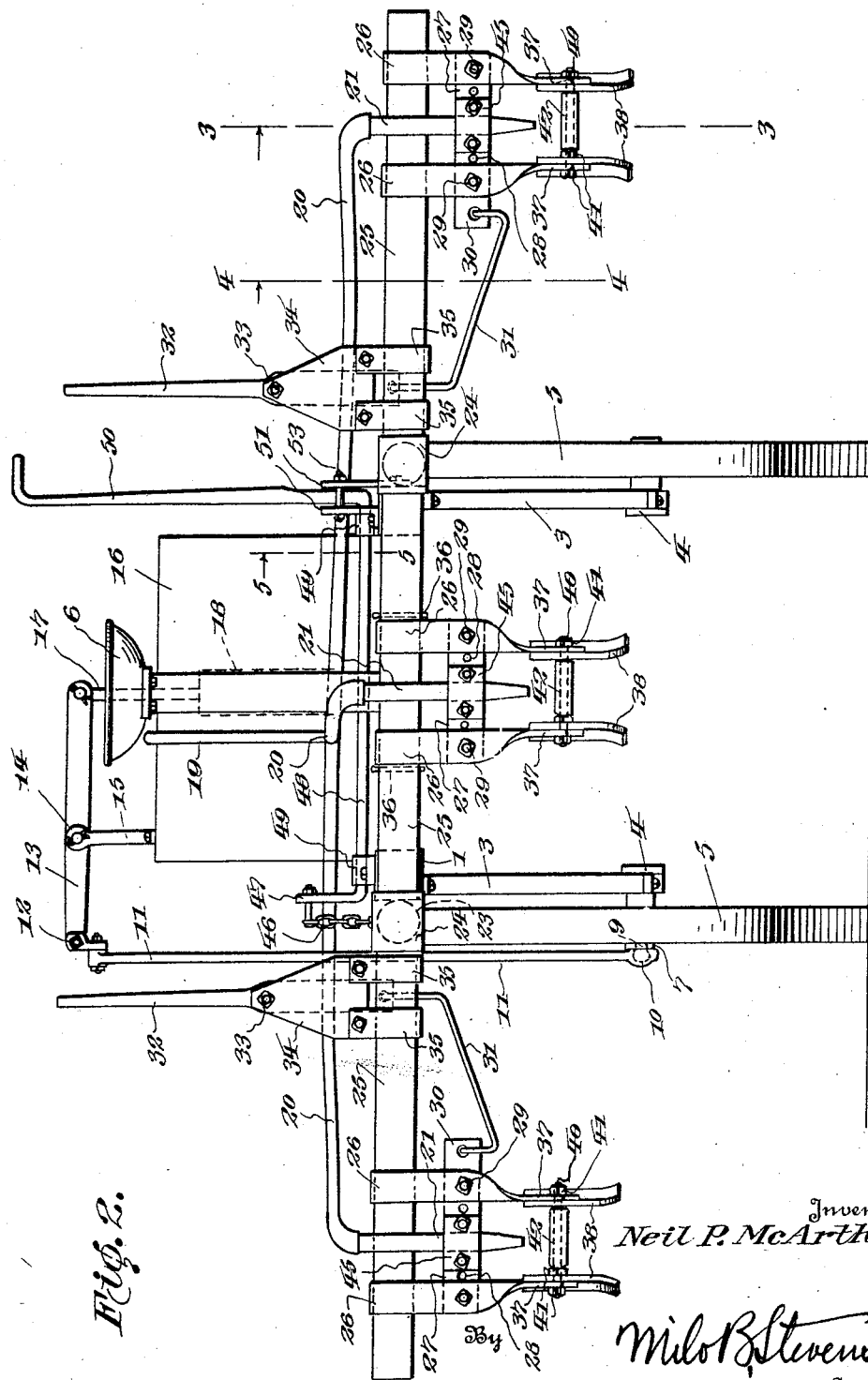

N. P. McARTHUR

SPRAYING MACHINE

Filed Aug. 18, 1923 3 Sheets-Sheet 3

Inventor.
Neil P. McArthur.

By Milo B. Stevens Co.

Attorneys.

Patented June 23, 1925.

1,543,021

UNITED STATES PATENT OFFICE.

NEILL PAT McARTHUR, OF WAKULLA, NORTH CAROLINA.

SPRAYING MACHINE.

Application filed August 18, 1923. Serial No. 658,064.

*To all whom it may concern:*

Be it known that I, NEILL P. MCARTHUR, a citizen of the United States, residing at Wakulla, in the county of Robeson and State of North Carolina, have invented new and useful Improvements in Spraying Machines, of which the following is a specification.

This invention relates to a spraying machine and more particularly to a machine for spraying an insecticide upon growing cotton plants for destroying the boll weevil thereon as the machine traverses the rows of cotton.

One of the objects of the invention is the provision of means for opening and exposing the harbors of the insects upon the plants and injecting the insecticide directly into such harbors for exterminating the weevil.

Another object is the provision of means for pivotally mounting a plurality of insecticide applying means to adapt the same to swing in a direction parallel to the line of travel of the machine to avoid abrupt contact with the cotton plants and to further provide against damage to said applying means when encountering obstructions in a field such as stumps, stones and the like; and the further provision of means for adjusting the insecticide applying means so as to adapt the same to plant rows of varying widths.

A further object of the invention is the provision of a novel form of adjustable means for operating a pump by one of the wheels of the machine, whereby to force a desired quantity of the insecticide contained in a reservoir upon the machine to the plurality of means for applying the insecticide upon the plants.

A still further object is the provision of means for raising and lowering the insecticide applying means, and also the provision of means for retaining the applying means at any desired height above the ground to adapt the same to plants of different heights.

These and other objects will more fully appear and the nature of the invention will be more clearly understood from the description in the following specification, the subject-matter of the appended claims and the illustrations in the accompanying drawings in which, Figure 1 is a side elevation of the invention;

Fig. 2 is a rear end view thereof;

Figure 4:
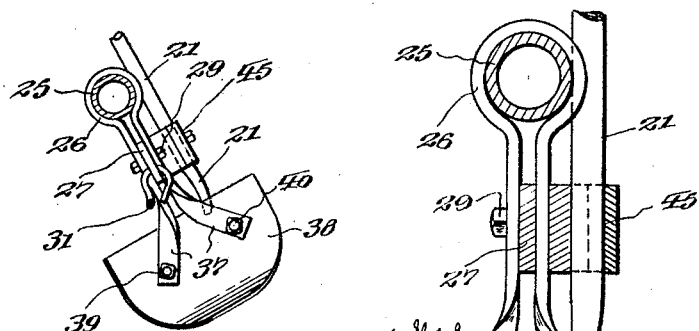
Figure 5:
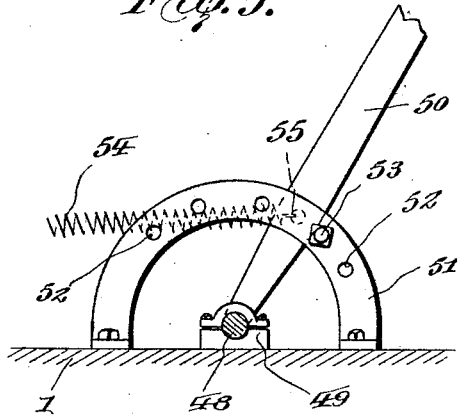

Fig. 4 is a side view, on line 4—4 of Fig. 2, looking in the direction of the arrows, showing the manner employed for mounting the insecticide applying means upon their supports, and Fig. 5 is a side view, on line 5—5 of Fig. 2, looking in the direction of the arrows, showing the construction of the means employed for raising and retaining the insecticide applying means at any desired height above the ground.

Referring specifically to the drawings, 1 denotes a frame of suitable construction provided with a tongue 2 by which the machine may be drawn across a field by horses, mules, or the like, though the machine may be arranged to be driven by any suitable motive power. The frame 1 is supported at a suitable height above the ground by the side brackets 3, provided at their lower ends with the pintles or stub axles 4 around which revolve the carrying wheels 5, the frame 1 also being provided at its rearward end with a driver's seat 6.

One of the wheels 5, preferably the left hand wheel, is provided with an enlarged spoke or plate 7 having a plurality of adjusting apertures 8 and through a selected one of which passes a bolt 9 for securing upon the spoke 7 of the wheel 5 a knuckle joint 10 of a connecting rod or bar 11, the upper end of which is connected by the swivel joint 12 to one end of a rocking arm 13 centrally pivoted in the yoke 14 of the bracket 15, suitably mounted upon a tank or reservoir 16 located upon the forward portion of the frame 1. The opposite end of the rocking arm 13 is pivotally connected to the upper end of the piston rod 17 of a pump 18, shown in dotted lines, and which pump 18 is suitably mounted or suspended within the reservoir 16 which is designed to contain a liquid insecticide. The pump 18 is actuated by the revolutions of the wheel 5 through its connections therewith, the lower end of the rod 11 being adjustably secured to the wheel 5 in the above described manner, whereby to increase or decrease the length of the stroke of the pump piston so as to regulate the quantity of the insecticide which is forced from the reservoir 16 by the pump 18 through its discharge pipe 19, the flexible distributing pipes 20 connected thereto and to the spray or injecting nozzles 21 which are three in number as shown.

Pivoted upon the rear end of the frame 1, at each side thereof, by the bolts 22 are the arms 23 provided at their free ends with the eyes or bearings 24, through which is mounted the transverse supporting rod or pipe 25 having its end portions projecting laterally outward for a distance beyond the sides of the machine as shown in Fig. 2 of the drawings.

Transversely mounted upon the supporting pipe 25 and adapted to swing thereon in a direction parallel to the line of travel of the machine are the central and outer end pairs of adjustably spaced loops 26 maintained in their adjusted spaced relation by the respective connecting bars 27 provided with a plurality of apertures 28 through which and the transverse medial portions of the loops 26 pass the bolts 29 for retaining the loops in their adjusted positions upon the bars 27. The outermost of the bars 27 are provided with inwardly extending portions 30 to which are connected one end of the links 31 having their opposite ends connected to the lower ends of the shifting levers 32 positioned at either side of the seat 6 and being centrally pivoted as at 33 in the upper ends of the brackets 34 rigidly secured upon the supporting pipe 25 by means of the clamps 35, whereby the outermost pairs of loops are capable of lateral adjustments with respect to the centrally positioned loops by the movements of the shifting levers 32 by the driver. The central loops are maintained against lateral movements on the pipe 25 by the pins 36 or other suitable limiting means to thereby hold these loops in strict alinement with the longitudinal medial line or center line of travel of the machine.

Figure 3:
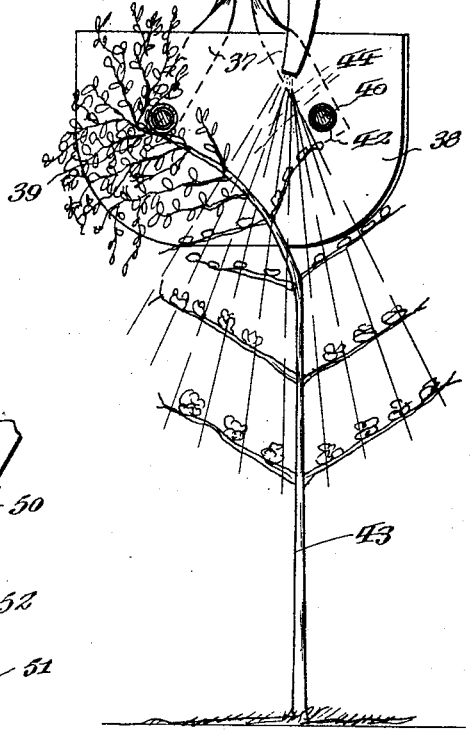
Fig. 3 is a detail sectional view, on line 3—3 of Fig. 2, looking in the direction of the arrows and showing the insecticide applying means in the act of spraying a cotton plant shown in elevation.

Each of the lower ends 37 of the loops 26 are bent substantially at right angles to the remaining portions of the loop and are deflected obliquely in opposite directions from each other, as shown in Figs. 1 and 4. Secured to the inner sides of the respective ends 37 of each pair of loops are the spaced vertical plates 38 having their lower edges outwardly and oppositely turned from each other. The plates 38 are also deflected laterally from each other in a forward direction by being secured upon the ends 37 in spaced relation by the longer forward bolts 39 and the shorter rearward bolts 40, the bolts 39 and 40 being each provided with retaining nuts 41 and their variance in length provides for the lateral deflection of the respective plates 38 relative to each other. The space between the plates 38 as well as the degree of lateral deflection from each other may be increased or decreased as desired by adjusting the loops 26 upon the bars 27 and substituting longer or shorter bolts 39 and 40. However, the bolts 39 and 40, in any event, are surrounded by a tube 42 of soft material or suitably wrapped therewith so as to avoid damage to the cotton plants when the same contacts therewith when passing thereover to expose the harbors of the insects in the so called squares and other parts upon the cotton plants 43 to the direct downward stream of the insecticide indicated at 44 from the nozzle 21 and in the manner clearly illustrated in Fig. 3.

The nozzles 21 are secured in adjusted operative position upon the respective bars 27 of the loops 26 by the cleats 45 adjustably bolted thereon so as to project the fluid substantially between the bolts 39 and 40 and directly into the insect harbors upon the plants which have been exposed by the bolts 39 and 40 passing over and bending the plants 43.

The loops 26 and their connecting bars 27 together with the side plates 38 and connecting bolts 39 and 40 constitute a substantial hood for embracing and surrounding the plants while being sprayed by the nozzles 21 projecting therein, and in order to raise the hoods and the coacting nozzles 21 at any desired height above the ground and retain the same thereat to accommodate the hoods to plants of different heights and ages of growth, the arm 23 is connected by the chain 46 to the crank arm 47 at one end of the horizontal rod 48 revolubly mounted in the bearing blocks 49 upon the frame, the rod 48 having at its opposite end the lifting lever 50 operating between the spaced quadrants 51 secured upon the frame and provided with registering apertures 52 through which projects the retaining bolt 53. The lever 50 being aided in its lifting movement by the tension or compensating spring 54, having one end connected to the lever 50 at 55 and its opposite end connected to the frame 1 at 56. The hoods are raised by the forward thrust of the lever 50 until the hoods are the desired distance from the ground and in accordance with the height of the plants to be sprayed wherein the bolt or pin 53 is inserted in the registering apertures just behind the lever 50 so as to retain the hoods constant at the desired height until it becomes necessary to again adjust their position. If it is desired to transport the machine, the lever 50 is forced to its farthermost forward limit to raise the hoods to the necessary height and the bolt 53 positioned therebehind. Should it become necessary to raise the hoods above the adjusted point to clear a high stump or large rock, the driver will force the lever 50 sufficiently forward to clear the obstacle and thereafter the lever 50 may be returned against the bolt 53 and no mistake or damage to the plants will be occasioned by the too much lowering of the hoods.

The center hood is designed to travel the middle row whilst the outer hoods are designed to travel the rows at either side thereof and are made adjustable laterally so as to cause the side hoods to follow the outer rows which may vary in their width from the center or middle row.

I claim:

1. A plant treating machine comprising a frame, a cross bar having arms pivoted to the frame, means associated with said arms for adjusting the cross bar vertically, inner and outer plant contact hoods having loops freely mounted on said cross bar and consisting of spaced side plates and front and rear connectors joining the plates, flexible pipes having spray nozzles discharging between said front and rear connectors and the side plates of the hood, and means connecting the nozzles to the hoods whereby the nozzles and the hoods move together.

2. A plant treating machine comprising a frame, a cross bar having arms pivoted to the frame, means associated with said arms for adjusting the cross bar vertically, inner and outer plant contact hoods having loops freely mounted on said cross bar and consisting of spaced side plates and front and rear connectors joining the plates, flexible pipes having spray nozzles discharging between said front and rear connectors and the side plates of the hood, means connecting the nozzles to the hoods whereby the nozzles and the hoods move together, levers having attaching loops connected to said cross bar, and links connecting the levers to the outer hoods for adjusting the outer hoods laterally of the machine, said connectors being adapted to contact with the plants to bend the same and thereby expose the insect harbors for spraying by said nozzles.

3. A plant treating machine comprising a frame, a cross bar having arms connected to the frame, plant contact hoods having loops freely mounted on said cross bar and consisting of spaced side plates and front and rear connectors joining the plates, flexible pipes having spray nozzles discharging between the side plates of the hood, means connecting the nozzles to the hoods whereby the nozzles and the hoods move together, levers having attaching loops connected to said cross bar, and links connecting the levers to certain of the hoods for adjusting said hoods laterally of the machine, said connectors being adapted to contact with the plants to bend the same and thereby expose the insect harbors for spraying by said nozzles, a reservoir for supplying said pipes and nozzles with an insecticide, and a pump for forcing the insecticide through the pipes and nozzles.

In testimony whereof I affix my signature.

NEILL PAT McARTHUR.